(12) United States Patent
Nishimura et al.

(10) Patent No.: US 7,404,709 B2
(45) Date of Patent: Jul. 29, 2008

(54) INJECTION UNIT OF INJECTION MOLDING MACHINE

(75) Inventors: Koichi Nishimura, Susono (JP); Koji Shima, Fujiyoshida (JP); Yasuo Naito, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 170 days.

(21) Appl. No.: 11/472,478

(22) Filed: Jun. 22, 2006

(65) Prior Publication Data

US 2006/0292257 A1    Dec. 28, 2006

(51) Int. Cl.
  *B29C 45/77*    (2006.01)
(52) U.S. Cl. .................. 425/145; 425/149; 425/150
(58) Field of Classification Search ............... 425/145, 425/149, 150
  See application file for complete search history.

(56) References Cited

U.S. PATENT DOCUMENTS

| | | | | |
|---|---|---|---|---|
| 4,693,676 | A | * | 9/1987 | Inaba ..................... 425/145 |
| 5,129,808 | A | * | 7/1992 | Watanabe et al. ........... 425/145 |
| 5,206,034 | A | | 4/1993 | Yamazaki et al. |
| 5,679,384 | A | * | 10/1997 | Emoto .................... 425/145 |
| 6,371,748 | B1 | * | 4/2002 | Hara ..................... 425/145 |
| 2002/0034560 | A1 | | 3/2002 | Tsai et al. |

FOREIGN PATENT DOCUMENTS

| | | |
|---|---|---|
| EP | 1 063 073 A | 12/2000 |
| JP | 02-016023 | 1/1990 |
| JP | 02 022025 A | 1/1990 |
| JP | 09-174628 | 7/1997 |
| JP | 10 151653 A | 6/1998 |
| JP | 2000-117789 | 4/2000 |
| JP | 2000 218663 A | 8/2000 |
| JP | 2000-334789 | 12/2000 |
| JP | 2003 211506 A | 7/2003 |

OTHER PUBLICATIONS

Extended European Search Report dated Oct. 16, 2006 issued in corresponding European patent application No. 06253273.4-2307.

* cited by examiner

*Primary Examiner*—Tim Heitbrink
(74) *Attorney, Agent, or Firm*—Staas & Halsey LLP

(57) ABSTRACT

The invention provides an injection molding machine injection unit that eliminates adverse effects on the load cell of belt tension due to belt drive. A load cell that detects resin pressure is mounted on a pusher plate and a rotation-transmitting member, on which an injection screw is fixedly mounted, is axially supported by an inner annular part of the load cell. The shaft of a pulley is axially supported on the pusher plate and coupled by splines to the rotation-transmitting member. A screw rotation motor is mounted on motor mounts of a housing mounted on the rear surface of the pusher plate. Tension on a belt run between the pulley and a pulley mounted on the motor output shaft concentrates a force at the base of the motor mounts. However, the housing is separate from the pusher plate and fixedly mounted on the pusher plate at a location other than that occupied by the base of the motor mounts. Therefore, the belt tension does not adversely affect the load cell, thus enabling high-accuracy resin pressure detection.

2 Claims, 2 Drawing Sheets

INJECTION UNIT OF INJECTION MOLDING MACHINE

BACKGROUND OF THE INVENTION

1. Field of the Invention

The present invention relates to an injection molding machine, and more particularly, to an injection unit of an injection molding machine provided with a load detection unit for detecting resin pressure on the injection screw.

2. Description of the Related Art

In an injection unit of an injection molding machine, a screw-type injection unit (that is, a screw-in-line-type injection unit) melts and kneads resin inside a heating cylinder by rotating an injection screw, and further, retracts the injection screw while applying pressure on the resin with the injection screw and measures the melted resin at that retracted position. Thereafter, the injection unit injects melted resin into a mold by advancing the screw.

As a result, it is necessary that the injection unit be provided with a mechanism that rotates the injection screw and a mechanism for driving the injection screw in an axial direction and injecting the resin.

An injection mechanism is known that comprises an injection unit by providing a pusher plate to which is fitted an injection screw so as to be freely rotatable but axially unmovable, providing on such pusher plate a pulley that rotates the injection screw and a screw rotation motor that drives the pulley by a belt, and further, providing thrust force drive means for injecting the resin with the injection screw by driving such pusher plate in the injection screw axial direction, and further, has a load detection unit such as a load cell for detecting the pressure on the injection screw (for example, JP 2-16023A and JP 9-174628A).

A load detection unit such as a load cell detects the resin pressure inside the heating cylinder, and the resin pressure detected by the load detection unit is used in back pressure control during a measuring step. In addition, in injection and pressure holding steps, the detected resin pressure is used in injection pressure feedback control, pressure holding feedback control and the like. Hence, it is desirable that the resin pressure be detected with greater accuracy.

As the means for rotating the screw, in that which uses a pulley-and-belt transmission mechanism, the belt is run between a drive pulley provided on the motor and a driven pulley provided on the injection screw side. This belt exerts a force in a radial direction on the pulley provided on the injection screw side, creating moment on the shaft on which the pulley is mounted, causing the force of friction of the injection mechanism unit to fluctuate and affecting the resin pressure detected by the load cell. Inventions that prevent these things from happening are also known (for example, JP 2000-117789A and JP 2000-334789A).

In an injection unit in which, as the means for rotating the injection screw mounted so as to be freely rotatable and axially unmovable on the pusher plate, the screw rotation motor is mounted on the pusher plate and a belt such as a timing belt is run between the drive pulley mounted on the output shaft of the motor and the driven pulley mounted on the injection screw side for driving the injection screw, and such belt transmission mechanism is used to rotate the injection screw, the force exerted by the belt on the drive pulley in the radial direction of the drive pulley also acts on the pusher plate through the motor that is mounted on the pusher plate, adversely affecting resin pressure detection of the load cell or other such load detection unit provided on that pusher plate.

SUMMARY OF THE INVENTION

The present invention is configured so that the effect of the force generated by the belt from the motor side does not reach the load detection unit.

An injection unit of the present invention rotates and axially moves an injection screw of an injection molding machine. The injection unit comprises: a first member arranged linearly movable and having a front face closer to the injection screw and a rear face remote from the injection screw; a pulley shaft rotatably supported by the first member and having a pulley fixed thereon on a rear side of the first member; a rotation-transmitting member connected with the pulley shaft such that a relative axial displacement in between is allowed, and connected with a rear end of the injection screw, for transmitting rotation of the pulley shaft to the injection screw; a load detection member mounted on the front face of the first member and having an inner annular portion supporting the rotation-transmitting member rotatably such that a relative axial displacement in between is inhibited, for measuring a resin pressure acting on the injection screw; a second member not integrally formed with the first member and attached to the rear face of the first member; a screw-rotation motor mounted on the second member for rotating the pulley fixed on the pulley shaft through a belt; and thrust force applying means for applying a thrust force to the second member so that the injection screw is axially moved.

The second member may have a main body and a mounting portion for mounting the screw-rotation motor to extend from the main body, and be fixed to the first member at positions remote from a proximal part of the mounting portion.

The screw rotation motor is drawn toward the second member by the tension of the belt run between the pulley shaft mounted on the first member and the screw rotation motor, causing the second member to deform. However, because the first member on which the load detection unit is mounted and the second member are configured as separate units, the first member is not affected by the tension of the belt, thus enabling high-accuracy resin pressure detection.

DETAILED DESCRIPTION

Figure 1:
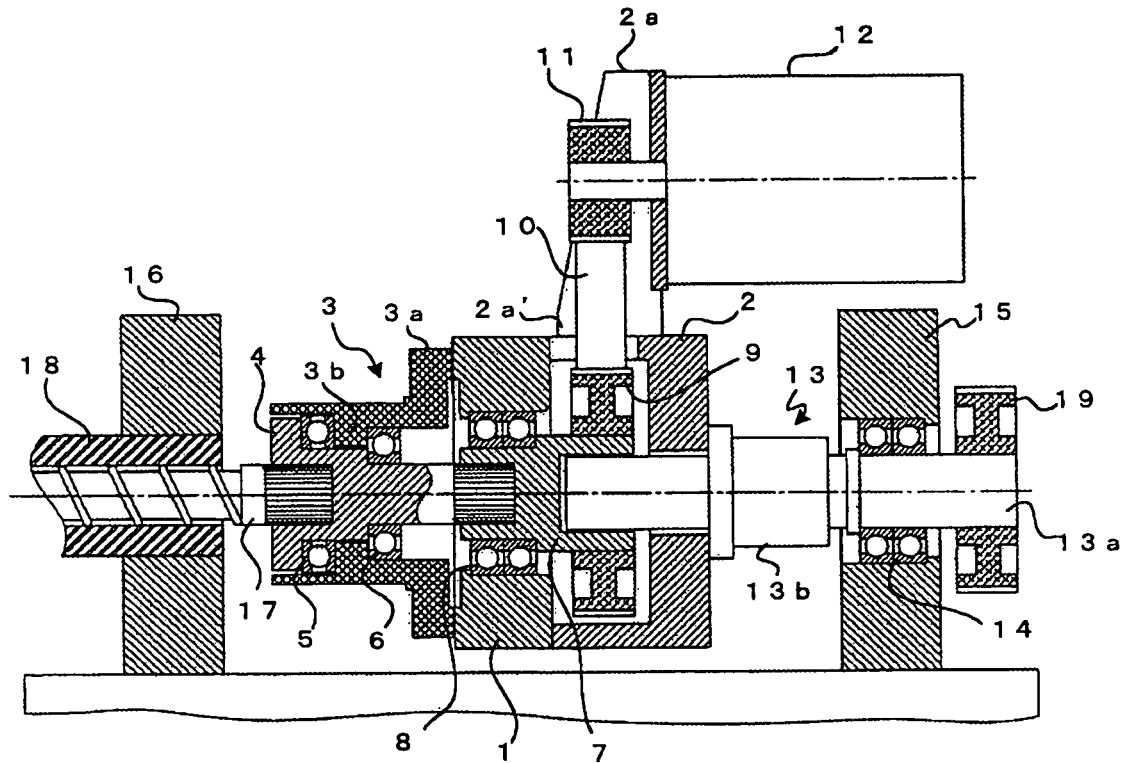
FIG. 1 is a diagram illustrating an injection unit of a first embodiment of the present invention.

FIG. 1 is a diagram illustrating an injection unit of a first embodiment of the present invention, showing a sectional view cut along a center line thereof.

An injection screw 17 is inserted into a heating cylinder 18 mounted on a front plate 16, with a rear end shaft fixedly mounted on a rotation-transmitting member 4. The rotation-transmitting member 4 is mounted through bearings 5,6 so as to rotate freely but is unable to move in an axial direction within an inner annular part 3b of a load cell 3 operating as a load detection unit. An outer annular part 3a of the load cell 3 is fixedly mounted on a pusher plate (first member) 1. A pulley shaft 7, on which is mounted a driven pulley 9, is mounted so as to be freely rotatable but axially unmovable on the pusher plate 1 through bearings 8. The pulley shaft 7 and the rotation-transmitting member 4 are connected by connecting means that limit only relative movement in a direction of rotation. In the present embodiment, the pulley shaft 7 and the rotation-transmitting member 4 are joined together by a spline coupling. Alternatively, instead of a spline coupling the pulley shaft 7 and the rotation-transmitting member 4 may be coupled by a key and key groove arrangement.

Further, a housing (second member) 2 is fixedly mounted on the pusher plate (the first member) 1, and to the housing 2 is connected thrust force drive means for driving the injection screw 17 and the pusher plate 1 axially (left and right in FIG. 1) and injecting melted resin inside the heating cylinder 18 into a mold, not shown. In this first embodiment, the thrust force drive means is composed of a ball screw/nut mechanism 13 and a motor, in which the ball nut 13b of the ball screw/nut mechanism 13 is fixed. In addition, a pair of motor mounts 2a that mount a screw rotation motor 12 that drives the rotation of the injection screw 17 projects from both lateral sides of the housing 2 (that is, both lateral sides as seen from the axial direction of the injection screw; see FIG. 2). The screw rotation motor 12 is mounted between the pair of motor mounts 2a, and a timing belt 10 is run between a drive pulley 11 provided on the output shaft of the motor 12 and the driven pulley 9.

A ball screw shaft 13a of the ball screw/nut mechanism 13 is mounted by bearings 14 on an end plate 15 so as to rotate freely, and mounts on its front end a driven pulley 19 for rotating the ball screw shaft 13a. A timing belt is run between the driven pulley 19 and a drive pulley provided on the output shaft of an injection motor, not shown, for driving the injection screw 17 in the axial direction. The injection motor drives the injection screw 17, the pusher plate 1 and the like axially. It should be noted that the ball nut 13b screws onto a threaded part of the ball screw shaft 13a. In addition, guide bars, not shown, that guide the pusher plate 1 are provided between the front plate 16 and the end plate 15. The pusher plate 1 is guided by the guide bars so as to be movable in the direction of the axis of the injection screw 17 (to the left and right in FIG. 1). Alternatively, the means for guiding the pusher plate 1 may be a linear guide.

Next, a description is given of the operation of the injection unit. During measuring/kneading, the screw rotation motor 12 drives, the driven pulley 9 is driven by the drive pulley 11 and the timing belt 10 and rotates, and the pulley shaft 7 on which the driven pulley 9 is fixedly mounted, the rotation-transmitting member coupled to the pulley shaft 7 by splines and the injection screw 17 mounted on the rotation-transmitting member 4 all rotate. The rotation of the injection screw 17 melts the resin supplied to the interior of the heating cylinder 18, and the pressure of the melted resin causes the injection screw 17 to retreat (that is, to move to the right in FIG. 1). The force of retraction of the retreating screw is transmitted to the rotation-transmitting member 4, to the load cell 3 by the bearings 5, and to the pusher plate 1 by the load cell 3, causing the pusher plate 1 and the housing 2 to retreat.

At the same time, the driving of the injection motor creates back pressure. In other words, the injection motor is driven, creating a force corresponding to a set back pressure that causes the driven pulley 19 and the ball screw shaft 13a to rotate, causing the ball nut 13b to advance and the housing 2 and the pusher plate 1 to advance (that is, to move to the left in FIG. 1). However, when the resin pressure exceeds this set back pressure, the injection screw 17, the rotation-transmitting member 4, the load cell 3, the pusher plate 1 and the housing 2 all retreat. During this time, the force of retraction of the injection screw 17 acts on the inner annular part 3b of the load cell 3 through the rotation-transmitting member 4, a distortion arises between the inner annular part 3b and the outer annular part 3a fixedly mounted on the pusher plate 1, and the resin pressure is detected.

In addition, in the injection and the pressure holding steps, the driving of the screw rotation motor 12 is stopped, the injection motor is driven and the ball screw shaft 13a is driven by the driven pulley 19. As a result, because the ball nut 13b engaged with threads of the ball screw shaft 13a is fixedly mounted on the housing 2 it advances without rotating along the shaft of the ball screw shaft 13a, the housing 2, which is fixedly mounted on the ball nut 13b, advances the pusher plate 1 on which the housing 2 is fixedly mounted, advancing the load cell 3, which is fixedly mounted on the pusher plate 1, the rotation-transmitting member 4 through the bearings 5 and the injection screw 17 fixedly mounted on the rotation-transmitting member 4 so as to inject resin into the mold. In addition, in the pressure holding step as well, the injection motor is driven so as to apply pressure on the resin at a set holding pressure by the injection screw 17 through the pusher plate 1.

In these injection and pressure holding steps as well, a force generated by the driving of the injection motor that attempts to advance the pusher plate 1 is exerted on the outer annular part 3a of the load cell 3, the resin pressure exerted on the injection screw 17 acts on the inner annular part 3b of the load cell 3, a distortion between the load cell outer annular part 3a and the inner annular part 3b arises and the resin pressure is detected.

The foregoing describes the operation of the injection unit of the present embodiment. However, as can be appreciated by those skilled in the art, the timing belt 10 is run between the drive pulley 11 provided on the output shaft of the screw rotation motor 12 and the driven pulley 9, and this timing belt 10 exerts on the screw rotation motor 12 a force that pulls the screw rotation motor 12 toward the housing side, and exerts a force on the driven pulley 9 that pulls the driven pulley 9 toward the screw rotation motor 12. Consequently, a moment acts on the pulley shaft 7 supported on the pusher plate 1 by the bearings 8. However, the pulley shaft 7 and the rotation-transmitting member 4 are coupled by splines, and since the play in the bearings is smaller than the play in this spline coupling, the moment force acting on the pulley shaft 7 is received and supported by the bearings 8.

At the same time, the tension of the timing belt 10 exerts on the housing 2 through the screw rotation motor 12 and the motor mounts 2a a force that pulls the drive pulley 11 mounted on the motor shaft toward the housing 2. The distinctive feature of the present invention is that the pusher plate 1 and the housing 2 on which the screw rotation motor 12 is mounted are not integrally formed and connected with each other, so that this force that is exerted on the housing 2 does not affect the load cell 3 through the pusher plate 1.

Figure 2:
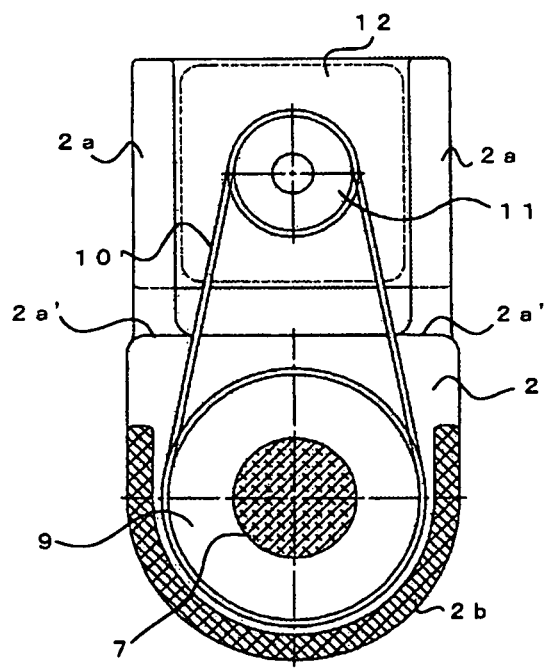
FIG. 2 is a diagram showing a sectional view in a direction vertical to the plane of the paper in FIG. 1, at an interface between pusher plate and housing in the first embodiment.

FIG. 2 is a diagram showing the interface between the pusher plate 1 and the housing 2, as a sectional view cut along a direction vertical to the plane of the paper in FIG. 1 (that is, as seen from the front side of the injection screw 17).

The pusher plate 1 and the housing 2 are tightly connected and fixed in place by bolts or the like at an abutting portion 2b indicated by cross-hatching in FIG. 2. However, the housing 2 and the pusher plate 1 are not tightly connected and are not fixed at proximal portions 2a' of the pair of motor mounts 2a each of which extends from both lateral sides of the housing 2 so as to mount the screw rotation motor 12. The force exerted on the housing 2 by the tension of the timing belt 10 through the drive pulley 11, the screw rotation motor 12 and the motor mounts 2a concentrates at the proximal portions 2a' and the housing 2 distorts around the proximal portions 2a' of the motor mounts 2a. However, the areas around the proximal portions 2a' of the motor mounts 2a are not connected to the pusher plate 1, and consequently, since the housing 2 and the pusher plate 1 are coupled at a distance from the proximal portions 2a', the distortions that concentrate at the proximal portions 2a' of the motor mounts 2a are dispersed without being transmitted to the pusher plate 1, and thus do not adversely affect the load cell 3.

Figure 3:
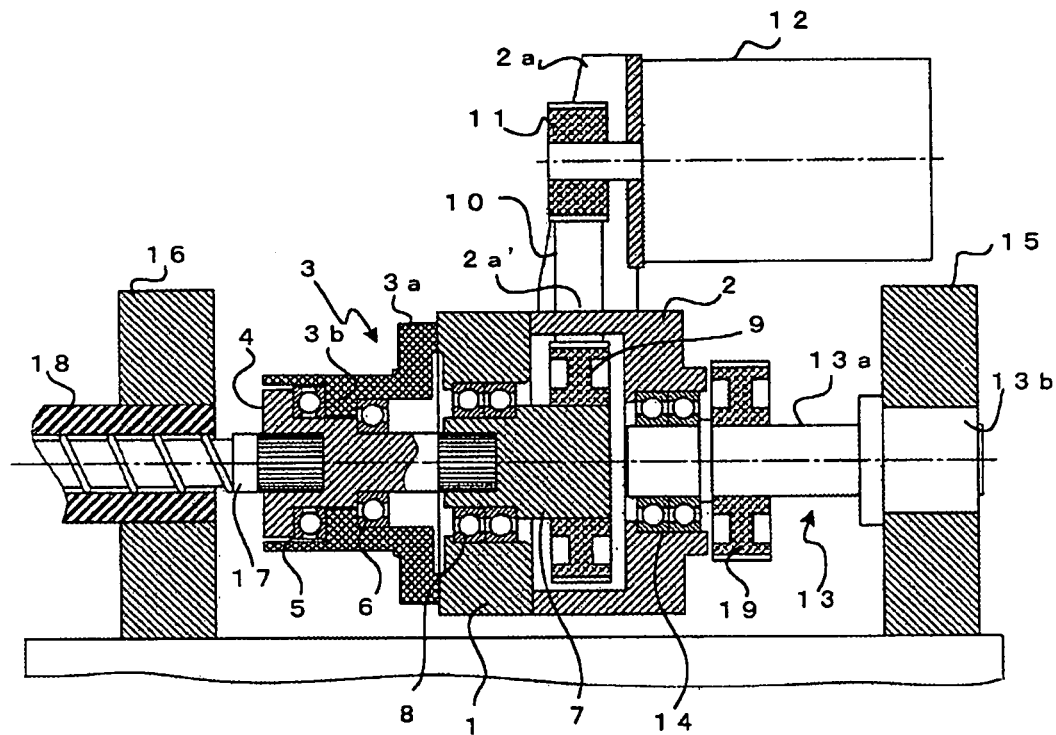
FIG. 3 is a diagram illustrating an injection unit of a second embodiment of the present invention.

FIG. 3 is a diagram illustrating an injection unit according to a second embodiment of the present invention, showing a sectional view cut along the central part thereof. In addition, FIG. 4, like FIG. 2, is a diagram showing the interface between the pusher plate 1 and the housing 2, as a sectional view cut along a direction vertical to the plane of the paper in FIG. 3 (that is, as seen from the front side of the injection screw 17).

In the second embodiment of the present invention, only the structure of the thrust force drive means that drives the injection screw 17 axially and the interface between the pusher plate 1 and the housing 2 are different from their counterparts in the first embodiment.

In the second embodiment, the ball nut 13b of the ball screw/nut mechanism 13 that forms the thrust force drive means is fixedly mounted on the end plate 15, and the threaded part of the ball screw shaft 13a screws into the ball nut 13b. Then, the other end of the ball screw shaft 13a is mounted on the housing 2 by bearings 14 so as to be rotatable but axially unmovable. In addition, the driven pulley 19 is mounted on the housing 2 side of the ball screw shaft 13a, and a timing belt is run between the driven pulley 19 and a drive pulley mounted on the output shaft of an injection motor, not shown.

Figure 4:
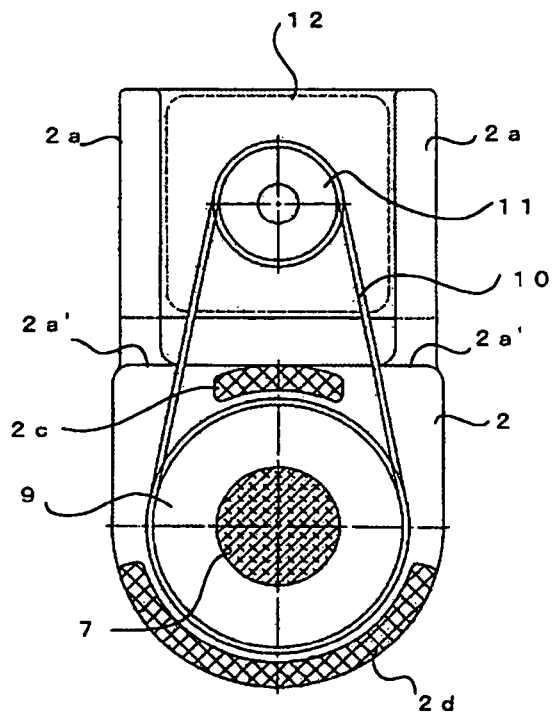
FIG. 4 is a diagram showing a sectional view in a direction vertical to the plane of the paper in FIG. 3, at an interface between pusher plate and housing in the second embodiment.

In addition, with respect to the housing 2 and the pusher plate 1, 2c and 2d indicated by cross-hatching in FIG. 4 form abutting portions, with the housing 2 and the pusher plate 1 joined at these abutting portions 2c, 2d and fixed in place by bolts or the like. The remaining structures are the same as those in the first embodiment. In addition, in the operation of this injection unit, the driven pulley 19 is driven by the injection motor and the ball screw shaft 13a rotates. The ball screw shaft 13a engages the ball nut 13b mounted on the end plate 15, and therefore the ball screw shaft 13a rotates as well as moves axially, causing the housing 2, on which is mounted the ball screw shaft 13a fixedly so as to be axially unmovable, and the pusher plate 1, which is fixedly mounted on the housing 2, to move axially, and moving the injection screw 17 axially to inject and the like. The operation of the thrust forcing drive means differs only slightly from that of the first embodiment, with the other operations identical to those of the first embodiment shown in FIG. 1.

At the same time, as shown in FIG. 4, the abutting portions 2c, 2d of the housing 2 and the pusher plate 1 are disposed at locations removed from the proximal portions 2a' of the projecting motor mounts 2a. As with the first embodiment, a force generated by the tension of the timing belt 10 is exerted on the drive pulley 11, the screw rotation motor 12, and, through the motor mounts 2a, on the housing 2, and concentrates at the proximal portions 2a' of the mounts 2a, causing the housing 2 to distort around the proximal portions 2a'. The proximal portions 2a' of the motor mounts 2a and the abutting portions 2c, 2d are disposed at different locations, and therefore the distortion is diffused without being transmitted to the pusher plate 1 and without adversely affecting the load cell 3 mounted on the pusher plate 1.

In each of the embodiments described above, the ball screw shaft rotates while the ball nut remains fixed. However, as can be understood by those skilled in the art, conversely, the ball screw shaft may be fixed while the ball nut rotates.

In addition, although a ball screw/nut mechanism 13 is used as the thrust force drive means, alternatively, a linear motor may be used instead.

What is claimed is:

1. An injection unit for rotating and axially moving an injection screw of an injection molding machine, comprising:
   a first member arranged linearly movable and having a front face closer to the injection screw and a rear face remote from the injection screw;
   a pulley shaft rotatably supported by said first member and having a pulley fixed thereon on a rear side of said first member;
   a rotation-transmitting member connected with said pulley shaft such that a relative axial displacement therebetween between is allowed, and connected with a rear end of the injection screw, for transmitting rotation of said pulley shaft to the injection screw;
   a load detection member mounted on the front face of said first member and having an inner annular portion supporting said rotation-transmitting member rotatably such that a relative axial displacement in between is inhibited, for measuring a resin pressure acting on the injection screw;
   a second member not integrally formed with said first member and attached to the rear face of said first member;
   a screw-rotation motor mounted on said second member for rotating the pulley fixed on said pulley shaft through a belt; and
   thrust force applying means for applying a thrust force to said second member so that the injection screw is axially moved.

2. An injection unit of an injection molding machine according to claim 1, wherein said second member has a main body and a mounting portion for mounting said screw-rotation motor to extend from the main body, and is fixed to said first member at positions remote from a proximal part of said mounting portion.

* * * * *

UNITED STATES PATENT AND TRADEMARK OFFICE
CERTIFICATE OF CORRECTION

PATENT NO. : 7,404,709 B2 Page 1 of 1
APPLICATION NO. : 11/472478
DATED : July 29, 2008
INVENTOR(S) : Koichi Nishimura et al.

It is certified that error appears in the above-identified patent and that said Letters Patent is hereby corrected as shown below:

Column 6, Line 30, after "therebetween" delete "between".

Column 6, Line 36, change "in between" to --therebetween--.

Signed and Sealed this

Twenty-eighth Day of October, 2008

JON W. DUDAS
*Director of the United States Patent and Trademark Office*